United States Patent
Guo et al.

(10) Patent No.: US 11,845,896 B1
(45) Date of Patent: Dec. 19, 2023

(54) STRUCTURAL STABILIZER FOR FIBER AND CONVENTIONAL PROPPANT COMPLEX IN EFFICIENT PROPPANT MIGRATION AND PLACEMENT TECHNOLOGY OF FRACTURED WELL AND PREPARATION METHOD

(71) Applicants: Chengdu LEPS Technology Co., Ltd, Chengdu (CN); Southwest Petroleum University, Chengdu (CN)

(72) Inventors: Jianchun Guo, Chengdu (CN); Shan Ren, Chengdu (CN); Hao Yang, Chengdu (CN); Yingxian Ma, Chengdu (CN); Kun Wang, Chengdu (CN); Jiyu Wang, Chengdu (CN); Cong Lu, Chengdu (CN); Jiapeng Zhang, Chengdu (CN); Zhihong Zhao, Chengdu (CN); Shaobin Zhang, Chengdu (CN); Qianli Lu, Chengdu (CN); Qingsong Guo, Chengdu (CN); Su Diao, Chengdu (CN); Chi Chen, Chengdu (CN); Xin Lei, Chengdu (CN); Mingyuan Zhou, Chengdu (CN); Chaojun Tang, Chengdu (CN)

(73) Assignees: Chengdu LEPS Technology Co., Ltd, Chengdu (CN); Southwest Petroleum University, Chengdu (CN)

( * ) Notice: Subject to any disclaimer, the term of this patent is extended or adjusted under 35 U.S.C. 154(b) by 0 days.

(21) Appl. No.: 18/352,214

(22) Filed: Jul. 13, 2023

(30) Foreign Application Priority Data

Jul. 19, 2022 (CN) .......................... 202210855027.3

(51) Int. Cl.
*C09K 8/80* (2006.01)
*C09K 8/60* (2006.01)
(Continued)

(52) U.S. Cl.
CPC ................ *C09K 8/80* (2013.01); *C09K 8/602* (2013.01); *C09K 8/845* (2013.01); *C09K 8/882* (2013.01);
(Continued)

(58) Field of Classification Search
CPC .......... C09K 8/80; C09K 8/602; C09K 8/845; C09K 8/882; C09K 8/905; C09K 2208/08; C09K 2208/12
See application file for complete search history.

(56) References Cited

U.S. PATENT DOCUMENTS

| | | | | |
|---|---|---|---|---|
| 11,708,571 B2 * | 7/2023 | Krebs | .................. | C12Y 401/02 435/232 |
| 2020/0056086 A1 * | 2/2020 | Haq | ........................ | E21B 43/16 |

FOREIGN PATENT DOCUMENTS

| | | |
|---|---|---|
| CN | 103741466 A | 4/2014 |
| CN | 104727800 A | 6/2015 |

(Continued)

OTHER PUBLICATIONS

Translation of CN 115217459 A (Year: 2022).*
(Continued)

*Primary Examiner* — Angela M DiTrani Leff
(74) *Attorney, Agent, or Firm* — Nitin Kaushik

(57) ABSTRACT

A structural stabilizer for a fiber and proppant complex to enhance proppant migration and placement in a fractured well during propping and a preparation method thereof are provided. The structural stabilizer consists of: water, inorganic salt, kaolinite, nitrogen-doped modified graphene oxide, anionic surfactant, non-ionic alkyl polyglucoside, and polyacrylamide. The structural stabilizer improves bonding between a proppant and a fiber when slick water is used in stimulated reservoir volume (SRV) fracturing, prevents separation of the fiber and the proppant during migration, (Continued)

thereby reducing escape rate of the fiber from the fiber and proppant complex.

8 Claims, 3 Drawing Sheets

(51) Int. Cl.
  *C09K 8/84*     (2006.01)
  *C09K 8/88*     (2006.01)
  *C09K 8/90*     (2006.01)
(52) U.S. Cl.
  CPC .......... *C09K 8/905* (2013.01); *C09K 2208/08* (2013.01); *C09K 2208/12* (2013.01)

(56) References Cited

FOREIGN PATENT DOCUMENTS

| | | |
|---|---|---|
| CN | 111961460 A | 11/2020 |
| CN | 115217459 A * | 10/2022 |

OTHER PUBLICATIONS

Chemtrade International, Products—Alkyl Polyglycosides, retrieved Oct. 23, 2023 from http://www.trade-chem.com/products/chanpin/APG.html (Year: 2023).*

* cited by examiner

STRUCTURAL STABILIZER FOR FIBER AND CONVENTIONAL PROPPANT COMPLEX IN EFFICIENT PROPPANT MIGRATION AND PLACEMENT TECHNOLOGY OF FRACTURED WELL AND PREPARATION METHOD

CROSS-REFERENCE TO RELATED APPLICATIONS

The application claims priority to Chinese patent application No. 2022108550273, filed on Jul. 19, 2022, the entire contents of which are incorporated herein by reference.

TECHNICAL FIELD

The invention pertains to the field of oil and gas reservoir stimulation technologies, more specifically to a structural stabilizer for fiber and conventional proppant complex in efficient proppant migration and placement technology of fractured well and preparation method.

BACKGROUND

The efficient proppant migration and placement technology of fractured well is a stimulation measure commonly used in oil and gas field development, specifically referring to the effect of adding a certain amount of fibers in the propping process to increase the migration distance and placement height of proppant, as well as reduce the backflow of proppant. In the traditional propped fracturing with guar crosslinked fluid, fibers are added to form intertwining structure to settle the proppant and generate a complex for the purpose of significantly increasing the migration distance and placement height of proppant, and reducing the backflow of proppant after fracturing, which is an effective method to improve the proppant settlement profile, improve the proppant placement effect and prevent proppant backflow in reservoir stimulation. Currently, SRV fracturing is an effective approach to develop unconventional oil and gas such as tight and shale oil and gas, where slick water is used to carry proppant. However, it is low-viscosity slick water used, the fiber and proppant are separated during migration due to the low density of polyester fiber and the high density of proppant, the escape rate of fiber from the proppant complex is up to more than 50%, and a large number of fibers escape from the proppant complex, failing to improve the proppant settlement profile and prevent proppant backflow. Moreover, a large number of escaped fibers are prone to plugging the oil nozzle, leading to incidents in bridge plug pumping and other downhole operations. Therefore, there is an urgent need to solve the above problems.

SUMMARY

The invention aims to provide a structural stabilizer for fiber and conventional proppant complex in efficient proppant migration and placement technology of fractured well and preparation method so as to address the problems of insufficient bonding between proppant and fiber when slick water is used in current SRV fracturing, separation of fiber and proppant during migration and high escape rate of fiber from the complex.

The above technical object of the present invention is achieved by the following solution to problem: a structural stabilizer for fiber and conventional proppant complex in efficient proppant migration and placement technology of fractured well, consisting of water, inorganic salt, kaolin, nitrogen-doped modified graphene oxide, anionic surfactant, non-ionic short-chain alkyl polyglucoside and polyacrylamide.

Principle of the solution: It is found in the development of the solution that there is no report on the study of reducing fiber escape rate in slick water during the application of efficient proppant migration and placement technology. Therefore, it is an important engineering demand to invent a new and widely applicable method to enhance the interaction between proppant and polyester fiber. It is found in the development of the solution that the strong $\pi$-electron induced effect of graphene can effectively act on polyester fiber and proppant to adsorb the ester groups in polyester fiber and the hydroxyl groups on proppant surface respectively. At the same time, due to its large specific surface area, graphene can act on multiple fibers and multiple proppants at the same time, promoting the polyester fibers and proppants to generate a more stable complex and making the complex to be carried by slick water smoothly. Despite these advantages, ordinary graphene is completely hydrophobic and difficult to disperse in water, so it is impossible to obtain practical results from its direct application to this system. Therefore, the inventor introduces stabilizer, synergist and other additives based on this technology to solve the problem of graphene dispersion in water, and uses nitrogen-doped modified graphene oxide with more special $\pi$-electron induced effect to achieve a better use effect. In the solution, water acts as a solvent, nitrogen-doped modified graphene oxide as an active component, kaolin as a synergist and stabilizer, and inorganic salt as an anti-swelling agent; anionic surfactant and non-ionic shortchain alkyl polyglucoside act as functional additives, which promote the dispersion of nitrogen-doped modified graphene oxide and calcined kaolin in the system on the one hand, and enhance the stability of the spatial structure formed between nitrogen-doped modified graphene oxide and kaolin on the other hand; polyacrylamide, as a thickener, enhances the suspension performance of the active components in the finished product and avoids the settlement and stacking of layered graphene and clay minerals. In addition, a stable and complex microscopic three-dimensional dispersion structure is generated by nitrogen-doped modified graphene oxide with calcined kaolin, anionic surfactant and non-ionic short-chain alkyl polyglucoside through interface effect, charge induced effect and steric hindrance effect.

Further, the structural stabilizer consists of the following components based on mass ratio: 84.0%-95.0% water, 0.1%-2.0% inorganic salt, 0.1%-5.0% kaolinite, 0.1%-5.0% nitrogen-doped modified graphene oxide, 0.1%-2.0% anionic surfactant, 0.1%-2.0% non-ionic short-chain alkyl polyglucoside, and 0.05%-0.2% polyacrylamide.

According to the solution to problem, it is found in the development of the solution that the structural stabilizer prepared with the above defined range of components has excellent stability, fluidity and economical efficiency, and if beyond the above range, it is difficult to generate an effective reagent.

Further, the inorganic salt is one or more combinations of sodium chloride, potassium chloride, potassium nitrate, sodium nitrate, potassium sulfate, sodium sulfate, potassium bisulfate; the anionic surfactant is one or more combinations of sodium dodecyl benzene sulfonate, dodecyl sodium sulfonate, sodium lauryl sulfate, and N-acyl glutamate.

According to the solution to problem, the inorganic salt, used as anti-swelling agent, is highly effective in preventing soil hydration and expansion so as to improve the rheological properties of drilling fluid, reduce its yield point and viscosity, and increase drilling speed; it can improve the texture of drilling cuttings to resist against lime contamination, gas migration, cement contamination and solid contamination. Potassium chloride and sodium chloride are inexpensive, economical and suitable for wide promotion. Since graphene is prone to undergo π-π stacking interaction and difficult to disperse, which is also true to kaolin, the anionic surfactant, with good surface activity and strong hydrophilicity, can effectively reduce the tension at the oil-water interface and can make the active ingredients in the system more uniformly dispersed, thus making the active components repeatedly function.

Further, the non-ionic short-chain alkyl polyglucoside is one or more combinations of APG0814, APG1214 and APG1210.

According to the solution to problem, the non-ionic short-chain alkyl polyglucoside mainly uses the interaction between the polyhydroxyl structure on its multi-carbon ring and the graphene delocalized electrons, as well as the steric hindrance of its short chain to play a role in supporting the interlayer spatial structure of graphene.

Further, the nitrogen-doped modified graphene oxide is one or more combinations of amino-modified graphene oxide and skeleton nitrogen-doped graphene oxide, where the N content is 1-5 wt %, the number of of nitrogen-doped graphene oxide layers is ≤10, and the layer size is ≤5 um.

According to the solution to problem, a complex microscopic three-dimensional dispersion structure is generated by nitrogen-doped modified graphene oxide with kaolin, anionic surfactant and on non-ionic short-chain alkyl polyglucoside through interface effect, charge induced effect and steric hindrance effect. When the structural stabilizer is applied, the fiber and proppant are constructed into a stable complex in the slick water system, which effectively increases the proppant placement height and reduces the fiber escape rate. Further, nitrogen-doped modified graphene oxide is used mainly to firstly improve the binding effect of graphene and additive through graphene doping to make it easy to disperse in water, and secondly to enhance the charge-induced effect of nitrogen atoms and oxygen atoms on the surface of graphene to change the uniformity of electron cloud on the surface, thus increasing the anchor points on the surface of graphene and making it more favorable for binding with polyester fiber and proppant.

Further, the kaolin is calcined kaolin of less than 100 meshes.

According to the solution to problem, the strong adsorption and adhesion of kaolin make it interact with the silicon hydroxyl group on the surface of the proppant aluminosilicate to promote a closer bond between the polyester fiber and the proppant and to prevent the fibers from escaping. If the calcined kaolin is too fine, with a size of 100 meshes or more, it is difficult to realize spatial support and bridging, which is unfavorable to the formation of microscopic three-dimensional stable structure.

Further, the polyacrylamide is an anionic polyacrylamide with a molecular weight of 0.1 to 1 million.

According to the solution to problem, polyacrylamide with appropriate molecular weight can not only thicken and improve the stability of the system, but also wind the branched chains, supporting the formation of the microscopic three-dimensional structure. If the molecular weight is too high, the viscosity of the system will be increased, affecting the fluidity. If the molecular weight is too low, the design effect will not be achieved.

Further, the fiber is PET polyester fiber, and the proppant is quartz sand (20 to 200 meshes in particle size) or coated sand.

According to the solution to problem, polyester fiber is a synthetic fiber obtained by spinning polyester polycondensated from organic dicarboxylic acid and dihydric alcohol, making it better bond to the anchor points on the structural stabilizer. At the same time, the proppant commonly used in efficient migration and placement technology of fractured well is quartz sand or precoated sand. The combination of quartz sand with precoated sand and polyester fiber can significantly increase the proppant placement volume and reduce fiber escape rate.

A method to prepare a structural stabilizer for fiber and conventional proppant complex in efficient proppant migration and placement technology of fractured well, comprising the following steps:

(1) Mix kaolin, water and inorganic salt and stir for 0.5-3 h to prepare uniform slurry;

(2) Continually stir them while adding nitrogen-doped modified graphene oxide, anionic surfactant, non-ionic short-chain alkyl polyglucoside and polyacrylamide in turn, and then stir them for 5-30 min to obtain the structural stabilizer.

According to the solution to problem, the kaolin, water and inorganic salt are mixed and stirred first, which is in favor of the full activation of raw materials and additives. If they are stirred for a long time, the effective components will be destroyed. If for a shot time, they cannot be dispersed effectively. Subsequently, nitrogen-doped modified graphene oxide, anionic surfactant, non-ionic short-chain alkyl polyglucoside and polyacrylamide are added successively in the stirring process, helping the raw materials spontaneously organize into a stable structure based on the interaction of non-covalent bonds.

Further, the stirring speed in Steps (1) and (2) is 500-3, 000 r/min.

According to the solution to problem, the materials can be effectively mixed and dispersed, and the additives can be fully activated. Too short a time or too low a speed will not achieve the purpose of effective mixing and dispersing and fully activating the materials, while too long a time or too high a speed may cause certain damage to the structure of the effective components of the product due to excessive shearing, thus reducing the effect.

In summary, the invention has the following beneficial effects: 1. A stable and complex microscopic three-dimensional structure is generated by nitrogen-doped modified graphene oxide with calcined kaolin, anionic surfactant and on non-ionic short-chain alkyl polyglucoside through interface effect, charge induced effect and steric hindrance effect; 2. A bridge is formed under the action of electron induced effect between the nitrogen-doped graphene conjugated system and polyester fibers; 3. The strong adsorption and adhesion of kaolin make it interact with the silicon hydroxyl group on the surface of the proppant aluminosilicate to promote a closer bond between the polyester fiber and the proppant and to prevent the fibers from escaping; 4. Moreover, the added graphene and kaolin strengthen the structural stability of the fiber and proppant complex, thus effectively improving the placement height of the proppant; compared with the case without the addition of structural stabilizer, the proppant placement height is increased by 40-50% and the fiber escape rate decreased from 80% to about 5% in the slick water and 70-140 quartz sand.

DETAILED DESCRIPTION OF THE EMBODIMENTS

Embodiment 1

Figure 1:
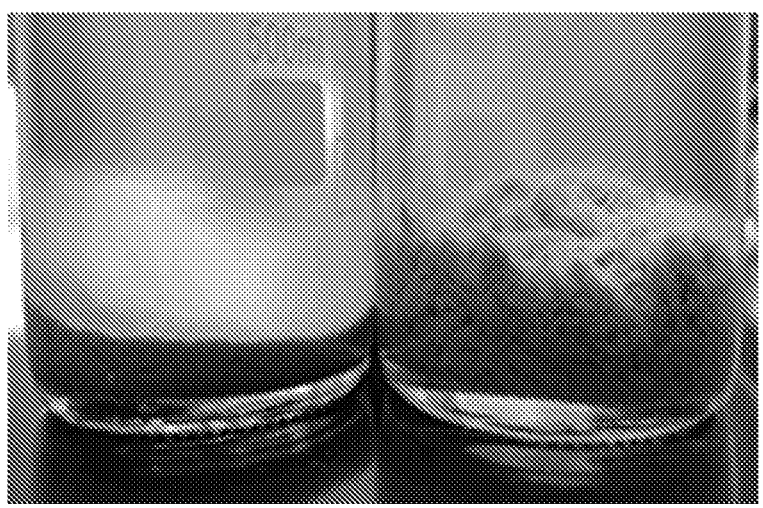
FIG. 1 is a comparison of fiber and proppant morphology between Experiment 2 (left) and Experiment 12 (right)

A method to prepare a structural stabilizer for efficient proppant migration and placement technology of fractured well: mix 2.5 kg kaolin with 0.1 kg sodium chloride and 94.3 kg water, stir them at a rate of 2,000 r/min for 2 h to prepare a uniform slurry, continually stir it, then add 2.5 kg nitrogen-doped modified graphene oxide, 0.2 kg sodium dodecyl benzene sulfonate, 0.2 kg APG0814, and 0.2 kg N-acyl glutamate in sequence, finally add 0.1 kg polyacrylamide, and stir them at a rate of 1,000 r/min for 15 min to obtain a structural stabilizer.

Embodiment 2

A method to prepare a structural stabilizer for efficient proppant migration and placement technology of fractured well: mix 1.0 kg kaolin with 0.1 kg sodium chloride, 0.1 kg potassium chloride and 93.1 kg water, stir them at a rate of 1,000 r/min for 2 h to prepare a uniform slurry, continually stir it, then add 5.0 kg nitrogen-doped modified graphene oxide, 0.2 kg sodium dodecyl benzene sulfonate, kg APG0814, and 0.2 kg N-acyl glutamate in sequence, finally add 0.1 kg polyacrylamide, and stir them at a rate of 500 r/min for 5 min to obtain a structural stabilizer.

Embodiment 3

A method to prepare a structural stabilizer for efficient proppant migration and placement technology of fractured well: mix 1.0 kg kaolin with 0.1 kg potassium chloride and 93.2 kg water, stir them at a rate of 2,000 r/min for 1 h to prepare a uniform slurry, continually stir it, then add 5.0 kg nitrogen-doped modified graphene oxide, 0.2 kg sodium dodecyl benzene sulfonate, 0.2 kg APG0814, and 0.1 kg N-acyl glutamate in sequence, finally add 0.2 kg polyacrylamide, and stir them at a rate of 1000 r/min for 30 min to obtain a structural stabilizer.

Embodiment 4

A method to prepare a structural stabilizer for efficient proppant migration and placement technology of fractured well: mix 5.0 kg kaolin with 0.5 kg sodium chloride and 88.8 kg water, stir them at a rate of 1,500 r/min for 3 h to prepare a uniform slurry, continually stir it, then add 5.0 kg nitrogen-doped modified graphene oxide, 0.2 kg sodium dodecyl benzene sulfonate, 0.2 kg APG1214, and 0.2 kg N-acyl glutamate in sequence, finally add 0.1 kg polyacrylamide, and stir them at a rate of 500 r/min for 10 min to obtain a structural stabilizer.

Embodiment 5

A method to prepare a structural stabilizer for efficient proppant migration and placement technology of fractured well: mix 0.1 kg kaolin with 1 kg sodium chloride and 95.3 kg water, stir them at a rate of 500 r/min for 3 h to prepare a uniform slurry, continually stir it, then add 1.0 kg nitrogen-doped modified graphene oxide, 1 kg sodium dodecyl benzene sulfonate, 0.5 kg APG0814, 0.5 kg APG1210, and 0.5 kg N-acyl glutamate in sequence, finally add 0.1 kg polyacrylamide, and stir them at a rate of 2,000 r/min for 5 min to obtain a structural stabilizer.

Embodiment 6

A method to prepare a structural stabilizer for efficient proppant migration and placement technology of fractured well: mix 5.0 kg kaolin with 2.0 kg sodium chloride and 84.9 kg water, stir them at a rate of 1,500 r/min for 2 h to prepare a uniform slurry, continually stir it, then add 2 kg nitrogen-doped modified graphene oxide, 2 kg sodium dodecyl benzene sulfonate, 2 kg APG1214, and 0.2 kg N-acyl glutamate in sequence, finally add 0.1 kg polyacrylamide, and stir them at a rate of 1,000 r/min for 15 min to obtain a structural stabilizer.

Embodiment 7

A method to prepare a structural stabilizer for efficient proppant migration and placement technology of fractured well: mix 5.0 kg kaolin with 0.1 kg sodium chloride and 89.5 kg water, stir them at a rate of 1,500 r/min for 2 h to prepare a uniform slurry, continually stir it, then add 5.0 kg nitrogen-doped modified graphene oxide, 0.1 kg sodium dodecyl benzene sulfonate, 0.1 kg APG0814, and 0.1 kg N-acyl glutamate in sequence, finally add 0.1 kg polyacrylamide, and stir them at a rate of 2,000 r/min for 15 min to obtain a structural stabilizer.

Embodiment 8

A method to prepare a structural stabilizer for efficient proppant migration and placement technology of fractured well: mix 5.0 kg kaolin with 0.5 kg sodium chloride and 88.9 kg water, stir them at a rate of 2,000 r/min for 2 h to prepare a uniform slurry, continually stir it, then add 5.0 kg nitrogen-doped modified graphene oxide, 0.2 kg sodium dodecyl benzene sulfonate, 0.2 kg APG0814, and 0.1 kg N-acyl glutamate in sequence, finally add 0.1 kg polyacrylamide, and stir them at a rate of 1,000 r/min for 15 min to obtain a structural stabilizer.

Figure 3:
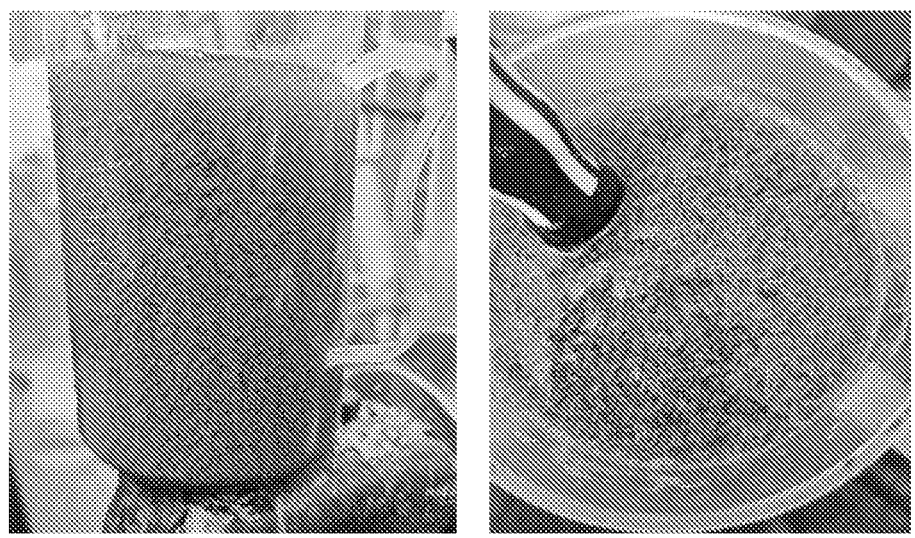
FIG. 3 is a schematic diagram of Experiment 12.

The experimental results of the efficient proppant migration and placement technology in Embodiment 8 are shown in FIG. 3, with no obvious fiber escape observed.

Figure 2:
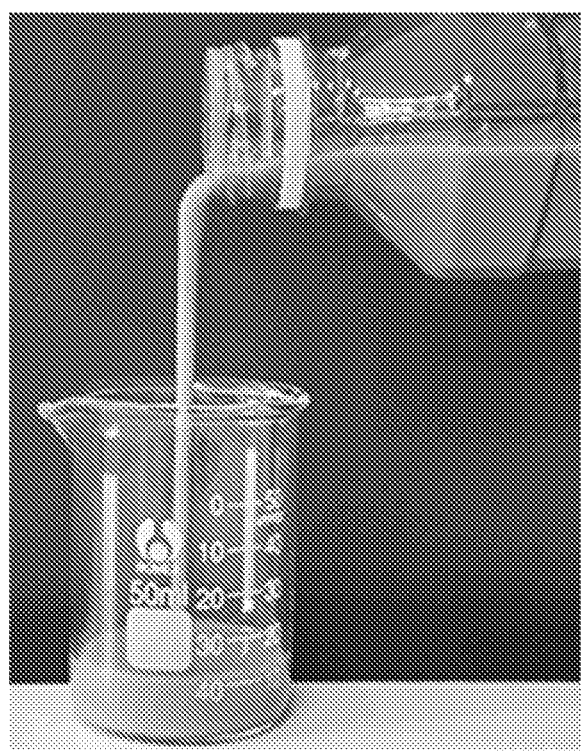
FIG. 2 is a diagram of the appearance and flowability of the structural stabilizer.

The appearance and fluidity of the structural stabilizer prepared by Embodiments 1-8 are shown in FIG. 2.

Comparative Embodiment 1

A method to prepare a structural stabilizer for efficient proppant migration and placement technology of fractured well: mix 5.0 kg kaolin with 0.1 kg sodium chloride and 89.8 kg water, stir them at a rate of 1,500 r/min for 2 h to prepare a uniform slurry, continually stir it, then add 5.0 kg nitrogen-doped modified graphene oxide in sequence, finally add 0.1 kg polyacrylamide, and stir them at a rate of 1,000 r/min for 15 min to obtain a structural stabilizer.

Comparative Embodiment 2

A method to prepare a structural stabilizer for efficient proppant migration and placement technology of fractured well: mix 5.0 kg kaolin with 0.1 kg sodium chloride and 94.3 kg water, stir them at a high rate for 2 h to prepare a uniform slurry, continually stir it, then add 0.2 kg sodium dodecyl benzene sulfonate, 0.2 kg APG0814, and 0.1 kg N-acyl glutamate in sequence, finally add 0.1 kg polyacrylamide, and stir them at a rate of 2,000 r/min for 15 min to obtain a structural stabilizer.

Comparative Embodiment 3

A method to prepare a structural stabilizer for efficient proppant migration and placement technology of fractured well: mix 0.5 kg sodium chloride with 93.9 kg water, stir them at a rate of 2,000 r/min for 2 h to prepare a uniform slurry, continually stir it, then add 5.0 kg nitrogen-doped modified graphene oxide, 0.2 kg sodium dodecyl benzene sulfonate, 0.2 kg APG0814, and 0.1 kg N-acyl glutamate in sequence, finally add 0.1 kg polyacrylamide, and stir them at a rate of 1,000 r/min for 15 min to obtain a structural stabilizer.

Propping Experiment

Apply the structural stabilizers prepared respectively in Embodiments 1-8 and Comparative Embodiments 1-3 to the implementation of the efficient proppant migration and placement technology, and determine the effect of the structural stabilizer on the proppant placement volume and fiber escape rate in the slick water.

The experiment includes the following steps:

(1) Take two dry 100 mL graduated cylinders and record them as 1# and 2# cylinders respectively; take another graduated cylinder to measure out two portions of 100 mL slick water, add them into two 250 mL beakers, and record them as 1# and 2# beakers.

(2) Transfer the 1# beaker to a vertical stirrer (with a speed of 700 r/min) while weighing 15.00 g of proppant and adding it into the 1# beaker, then stir them for 2 min to make the proppant evenly distributed in the slick water; stop stirring and remove the 1# beaker quickly, stir the slick water with a glass rod while pouring it into the 1# cylinder, put the 1# cylinder on the horizontal table, and count the time; after 5 min, read the placement volume $V_1$ of the proppant as the control group until the proppant is completely settled.

(3) Weigh 0.075 g of fiber and place it in the 2# beaker, record the mass as $m_0$, and transfer 1.0 mL of structural stabilizer with a 1.0 mL syringe (with the needle removed) into the 2# beaker at a rate of 0.5 mL/s.

(4) Transfer the 2# beaker to the vertical stirrer (with a speed of 700 r/min) while weighing 15.00 g of proppant and adding it into the 2# beaker, then stir them for 2 min to make the proppant, fiber and structural stabilizer evenly distributed in the slick water; stop stirring and remove the 2# beaker quickly, stir the slick water with a glass rod while pouring it into the 2# cylinder, put the 2# cylinder on the horizontal table, and count the time; after 5 min, read the placement volume $V_2$ of the proppant until the proppant is completely settled.

(5) Pour the supernatant and floating fibers in the 2# cylinder into a 20-mesh filter, wash the fibers with clean water, and then dry and weigh them; record the mass as $m_2$, and calculate the fiber escape rate 11 according to Equation (1): $\eta=(m_2/m_0)\times 100\%$.

The experimental conditions are as follows: the viscosity of the slip water is 2 to 30 mPa·s, the proppant ratio is 10 to 40%, the fiber is PET polyester fiber, the fiber dosage is 0.1 to 1.0%, and the proppant is quartz sand of 20-200 meshes or precoated sand of 40-70 meshes. The determination results are shown in Table 1.

Experiments 1-4 are control experiments without structural stabilizer. Structural stabilizers obtained from Embodiments 1-8 are added successively in Experiments 5-12. Structural stabilizers obtained from Comparative Embodiments 1-3 are added successively in Experiments 13-15 in turn. Experiments 16-23 are comparative experiments to adjust the parameter settings on the basis of Experiment 12.

TABLE 1

Results of Proppant Placement Volume and Fiber Escape during the Simulated Application of Structural Stabilizer to Efficient Proppant Migration and Placement Technology

| Experiment No. | Product Model | Proppant Type | Proppant Size (mesh) | Proppant ratio (%) | Slick Water Viscosity (mPa·s) | Fiber Type | Fiber Dosage (%) | Structure Stabilizer Dosage (%) | Effective Proppant Placement Volume (ml) | Fiber Escape (%) |
|---|---|---|---|---|---|---|---|---|---|---|
| 1 | Control Group 1 | Quartz sand | 70 | 20 | 6 | PET Polyester Fiber | 0 | 0 | 20 | 0 |
| 2 | Control Group 2 | Quartz sand | 70 | 20 | 6 | PET Polyester Fiber | 0.5 | 0 | 24 | 65.3 |
| 3 | Control Group 3 | Precoated Sand | 40 | 20 | 6 | PET Polyester Fiber | 0 | 0 | 20 | 0 |
| 4 | Control Group 4 | Precoated Sand | 40 | 20 | 6 | PET Polyester Fiber | 0.5 | 0 | 23 | 72.1 |
| 5 | Embodiment 1 | Quartz sand | 30 | 20 | 6 | PET Polyester Fiber | 0.5 | 0.5 | 26 | 46.7 |
| 6 | Embodiment 2 | Quartz sand | 60 | 20 | 6 | PET Polyester Fiber | 0.5 | 0.5 | 27.5 | 33.8 |
| 7 | Embodiment 3 | Quartz sand | 90 | 20 | 6 | PET Polyester Fiber | 0.5 | 0.5 | 28.3 | 21.8 |
| 8 | Embodiment 4 | Quartz sand | 180 | 20 | 6 | PET Polyester Fiber | 0.5 | 0.5 | 29.2 | 15.6 |
| 9 | Embodiment 5 | Quartz sand | 170 | 20 | 6 | PET Polyester Fiber | 0.5 | 0.5 | 24.5 | 45.8 |
| 10 | Embodiment 6 | Quartz sand | 160 | 20 | 6 | PET Polyester Fiber | 0.5 | 0.5 | 24.9 | 35.8 |
| 11 | Embodiment 7 | Quartz sand | 100 | 20 | 6 | PET Polyester Fiber | 0.5 | 0.5 | 24.7 | 37.2 |
| 12 | Embodiment 8 | Quartz sand | 140 | 20 | 6 | PET Polyester Fiber | 0.5 | 0.5 | 30.5 | 5.8 |

TABLE 1-continued

Results of Proppant Placement Volume and Fiber Escape during the Simulated
Application of Structural Stabilizer to Efficient Proppant Migration and Placement Technology

| Experiment No. | Product Model | Proppant Type | Proppant Size (mesh) | Proppant ratio (%) | Slick Water Viscosity (mPa · s) | Fiber Type | Fiber Dosage (%) | Structure Stabilizer Dosage (%) | Effective Proppant Placement Volume (ml) | Fiber Escape (%) |
|---|---|---|---|---|---|---|---|---|---|---|
| 13 | Comparative Embodiment 1 | Quartz sand | 140 | 20 | 6 | PET Polyester Fiber | 0.5 | 0.5 | 24.4 | 56.7 |
| 14 | Comparative Embodiment 2 | Quartz sand | 140 | 20 | 6 | PET Polyester Fiber | 0.5 | 0.5 | 24.3 | 66.4 |
| 15 | Comparative Embodiment 3 | Quartz sand | 140 | 20 | 6 | PET Polyester Fiber | 0.5 | 0.5 | 24.6 | 47.4 |
| 16 | Embodiment 8 | Precoated Sand | 70 | 20 | 6 | PET Polyester Fiber | 0.5 | 0.5 | 27 | 22.6 |
| 17 | Embodiment 8 | Precoated Sand | 70 | 20 | 6 | PET Polyester Fiber | 0.5 | 1.0 | 29.3 | 12.1 |
| 18 | Embodiment 8 | Quartz sand | 140 | 20 | 30 | PET Polyester Fiber | 0.5 | 0.5 | 30.1 | 2.7 |
| 19 | Embodiment 8 | Quartz sand | 140 | 20 | 2 | PET Polyester Fiber | 0.5 | 0.5 | 16.6 | 33.4 |
| 20 | Embodiment 8 | Quartz sand | 140 | 30 | 6 | PET Polyester Fiber | 0.5 | 0.5 | 34.3 | 16.8 |
| 21 | Embodiment 8 | Quartz sand | 140 | 10 | 6 | PET Polyester Fiber | 0.5 | 0.2 | 13.0 | 6.8 |
| 22 | Embodiment 8 | Quartz sand | 140 | 20 | 6 | Lignin Fiber | 0.5 | 0.5 | 22.3 | 63.5 |
| 23 | Embodiment 8 | Ceramite | 140 | 20 | 6 | PET Polyester Fiber | 0.5 | 0.5 | 26.7 | 26.9 |

According to Table 1, it can be found that the effective placement volume of the proppant can be increased by adding fibers during placement by comparing Experiments 1 and 2 with Experiments 3 and 4, and that the addition of structural stabilizer can further enhance the effective proppant placement volume and significantly reduce the fiber escape rate by comparing Experiment 2 with Experiments 5-12, as shown in FIG. 1.

Comparing Experiments 5-12 with Experiments 13-15 (the schematic diagram of Experiment 12 is shown in FIG. 3), it can be seen that the enhancement of the effective proppant placement volume by the structural stabilizer prepared in Comparative Embodiments 1-3 is equivalent to that by the structural stabilizer prepared in Embodiments 1-8 on average. In a comprehensive perspective, the structural stabilizer provided by the invention is obviously advantaged in in enhancing the effective proppant placement volume and reducing the fiber escape rate.

Comparing Experiment 16 and Experiment 17, it can be learned that when the amount of structural stabilizer is increased, the effect is better on increasing the proppant placement height and reducing the fiber escape rate. Comparing Experiment 12 with Experiments 16 and 17, it can be found that when quartz sand is used as the proppant, the structural stabilizer has a better effect on increasing the effective proppant placement volume and reducing the fiber escape rate.

Comparing Experiment 12 and Experiment 18, it can be seen that the structural stabilizer can further reduce the fiber escape rate when slick water with higher viscosity is used. Comparing Experiment 12 with Experiment 19, it can be learned that when slick water with low viscosity is used, the smaller the proppant ratio has a less effect on the improvement of proppant placement height and the reduction of fiber escape rate. Therefore, it follows that the solution to problem provided by the invention is highly applicable.

Comparing Experiment 20 and Experiment 21, it can be seen that the smaller the amount of structural stabilizer used, the better its effect on reducing fiber escape rate, and correspondingly the weaker its effect on enhancing the effective proppant placement volume.

Comparing Experiment 12 and Experiment 22, it can be seen that lignin fiber has no surface characteristics of polyester fiber, making it difficult to achieve the effect of the invention, and the efficient proppant placement effect is not significant, and the fiber escape rate is obviously higher.

Comparing Experiment 12 and Experiment 23, it can be found that when ceramsite proppant has no surface functional groups of quartz sand and precoated sand, so it is difficult to achieve the effect of the invention, the efficient proppant placement effect is significantly weakened, and the fiber escape rate is obviously increased.

The specific embodiment is only an explanation of the present invention, and not a limitation of the present invention. Those skilled in the art may, after reading this specification, make modifications to the embodiment as needed without creative effort, but such modifications will be protected by patent law as long as they fall within the scope of the claims of the present invention.

What is claimed is:

1. A structural stabilizer for a fiber and proppant complex to enhance proppant migration and placement in a fractured well during propping, consisting of the following components in a mass ratio: 84.0%-95.0% of water, 0.1%-2.0% of an inorganic salt, 0.1%-5.0% of kaolinite, 0.1%-5.0% of a nitrogen-doped modified graphene oxide, 0.1%-2.0% of an anionic surfactant, 0.1%-2.0% of a non-ionic alkyl polyglucoside, and 0.05%-0.2% of polyacrylamide; wherein the non-ionic alkyl polyglucoside is selected from the group consisting of C08-C14 alkyl polyglycoside, C12-C14 alkyl polyglycoside, C12-C10 alkyl polyglycoside, and combinations thereof, and wherein addition of the structural stabilizer to the fiber and proppant complex reduces a fiber escape rate and improves a proppant placement height in the fractured well.

2. The structural stabilizer according to claim 1, wherein the inorganic salt is selected from the group consisting of sodium chloride, potassium chloride, potassium nitrate, sodium nitrate, potassium sulfate, sodium sulfate, potassium bisulfate, and combinations thereof; and the anionic surfactant is selected from the group consisting of sodium dodecyl benzene sulfonate, dodecyl sodium sulfonate, sodium lauryl sulfate, N-acyl glutamate, and combinations thereof.

3. The structural stabilizer according to claim 2, wherein the nitrogen-doped modified graphene oxide is selected from the group consisting of amino-modified graphene oxide, skeleton nitrogen-doped graphene oxide, and combinations thereof, wherein nitrogen (N) content in the nitrogen-doped modified graphene oxide is 1-5 wt %, a number of nitrogen-doped graphene oxide layers in the nitrogen-doped modified graphene oxide is ≤10, and a layer size of each nitrogen-doped graphene oxide layer is <5 um.

4. The structural stabilizer according to claim 2, wherein the kaolinite is calcined kaolin of less than 100 mesh.

5. The structural stabilizer according to claim 2, wherein the polyacrylamide is an anionic polyacrylamide with a molecular weight of 0.1 to 1 million.

6. The structural stabilizer according to claim 1, wherein a fiber of the fiber and proppant complex is polyethylene terephthalate (PET), and a proppant of the fiber and proppant complex is quartz sand or coated sand, wherein the quartz sand is 20 to 200 mesh in particle size.

7. A method for preparing the structural stabilizer of claim 1 comprising:
mixing the kaolinite, the water and the inorganic salt and stirring for 0.5-3 h to prepare a slurry; and
continuously stirring the slurry while adding the nitrogen-doped modified graphene oxide, the anionic surfactant, the non-ionic alkyl polyglucoside and the polyacrylamide in turn, and stirring for 5-30 min to obtain the structural stabilizer.

8. The according to claim 7, wherein a stirring speed during preparing and stirring the slurry is 500-3,000 r/min.

* * * * *